US008472286B2

(12) United States Patent
Stipe (10) Patent No.: US 8,472,286 B2
(45) Date of Patent: Jun. 25, 2013

(54) NEAR FIELD TRANSDUCER HAVING MAIN BODY AND WINGS EXTENDING THEREFROM AND ONLY ELECTRICALLY COUPLED THEREBY

(75) Inventor: Barry Cushing Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 519 days.

(21) Appl. No.: 12/347,134

(22) Filed: Dec. 31, 2008

(65) Prior Publication Data

US 2010/0165499 A1    Jul. 1, 2010

(51) Int. Cl.
*G11B 11/00*    (2006.01)
(52) U.S. Cl.
USPC .................................. 369/13.33; 369/13.13
(58) Field of Classification Search
USPC ................ 360/59; 369/13.33, 13.13, 13.32, 369/13.17, 112.09, 112.14, 112.21, 112.27; 385/129, 31, 88–94; 250/201.3, 201.5
See application file for complete search history.

(56) References Cited

U.S. PATENT DOCUMENTS

| 5,260,921 | A | * | 11/1993 | Shibuya et al. | 369/13.17 |
| 5,703,840 | A | * | 12/1997 | Kazama | 369/13.17 |
| 6,009,051 | A | * | 12/1999 | Kazama | 369/13.17 |
| 6,429,419 | B1 | | 8/2002 | Mitsuoka et al. | 250/216 |
| 6,445,667 | B1 | | 9/2002 | Bernacki et al. | 369/100 |
| 6,768,556 | B1 | | 7/2004 | Matsumoto et al. | 356/601 |
| 6,771,445 | B1 | | 8/2004 | Hamann et al. | 360/59 |
| 6,773,764 | B2 | | 8/2004 | Marinero et al. | 427/557 |
| 6,839,191 | B2 | | 1/2005 | Sugiura et al. | 359/738 |
| 6,944,101 | B2 | | 9/2005 | Johns et al. | 369/13.13 |
| 6,970,307 | B2 | | 11/2005 | Sugiura et al. | 359/738 |
| 6,999,384 | B2 | | 2/2006 | Stancil et al. | |
| 7,095,767 | B1 | | 8/2006 | Thornton et al. | 372/45 |
| 7,272,102 | B2 | * | 9/2007 | Challener | 369/112.27 |
| 7,307,923 | B2 | | 12/2007 | Miyanishi et al. | 369/13.02 |
| 7,359,599 | B2 | | 4/2008 | Matsumoto | 385/47 |

(Continued)

FOREIGN PATENT DOCUMENTS

JP    2006351091    12/2006
JP    2007293972    11/2007

OTHER PUBLICATIONS

Xu et al., "Design, fabrication, and characterization of nanometer-scale ridged aperture optical antennae" Proc. of SPIE vol. 6106.

(Continued)

*Primary Examiner* — Tan X Dinh
(74) *Attorney, Agent, or Firm* — Zilka-Kotab, PC (57) ABSTRACT

According to one embodiment, an apparatus includes a near field transducer comprising a conductive metal film having a main body, a ridge extending from the main body, and wings extending from the main body in a same direction as the ridge, wherein the wings are only electrically coupled by the main body. In another embodiment, an apparatus includes a near field transducer comprising a conductive metal film having a main body, a ridge extending from the main body, and wings extending from the main body in a same direction as the ridge. Also the apparatus includes a layer of magnetic material positioned beyond the wings relative to the main body, wherein a length of the layer of magnetic material adjacent the near field transducer is at least about coextensive with a length of the main body in a same direction.

24 Claims, 8 Drawing Sheets

U.S. PATENT DOCUMENTS

| | | | |
|---|---|---|---|
| 7,649,677 B2 * | 1/2010 | Jin et al. | 359/325 |
| 7,880,996 B2 * | 2/2011 | Stipe | 360/59 |
| 2002/0163862 A1 * | 11/2002 | Ohmori | 369/13.23 |
| 2004/0062152 A1 * | 4/2004 | Stancil et al. | 369/13.33 |
| 2005/0031278 A1 | 2/2005 | Shi et al. | 385/121 |
| 2005/0068669 A1 * | 3/2005 | Hsu et al. | 360/125 |
| 2005/0068673 A1 * | 3/2005 | Lille | 360/126 |
| 2006/0044682 A1 * | 3/2006 | Le et al. | 360/126 |
| 2006/0174474 A1 * | 8/2006 | Le | 29/603.12 |
| 2006/0182393 A1 * | 8/2006 | Sendur et al. | 385/39 |
| 2006/0187564 A1 * | 8/2006 | Sato et al. | 360/59 |
| 2007/0041119 A1 | 2/2007 | Matsumoto et al. | 360/59 |
| 2007/0058686 A1 | 3/2007 | Capasso et al. | 372/43.01 |
| 2007/0069429 A1 * | 3/2007 | Albrecht et al. | 264/482 |
| 2007/0081427 A1 | 4/2007 | Suh et al. | 369/13.33 |
| 2007/0096854 A1 | 5/2007 | Matsumoto et al. | 335/208 |
| 2007/0115584 A1 * | 5/2007 | Balamane et al. | 360/126 |
| 2008/0080039 A1 | 4/2008 | Hongo et al. | 359/237 |
| 2008/0149809 A1 * | 6/2008 | Hamann et al. | 250/201.1 |
| 2008/0151360 A1 * | 6/2008 | Stipe | 359/350 |
| 2009/0258186 A1 * | 10/2009 | Fontana et al. | 428/131 |
| 2010/0002330 A1 * | 1/2010 | Lille | 360/59 |
| 2010/0165822 A1 * | 7/2010 | Balamane et al. | 369/112.27 |
| 2011/0096431 A1 * | 4/2011 | Hellwig et al. | 360/59 |

OTHER PUBLICATIONS

Cubukcu et al., "Plasmonic laser antenna" Applied Physics Letter 89, 093120 (2006).

Chen et al., "Double-Corrugated C-Shaped Aperture for Near-Field Recording" Japanese Journal of Applied Physics, vol. 45, No. 2B, 2006, pp. 1348-1350.

Sun et al., "Topology Visualization of the Optical Power Flow through a Novel C-Shaped Nano-Aperture" IEEE Visualization 2004: Oct. 10-15, Austin, Texas, USA.

Sendur et al., "Ridge waveguide as a near field aperture for high density data storage" Journal of Applied Physics, vol. 96, No. 5, Sep. 1, 2004.

Schlesinger et al., "Integrated Read/Write Head for Hybrid Recording" Japanese Journal of Applied Physics, vol. 41 (2002) pp. 1821-1824, Part 1, No. 3B, Mar. 2002.

U.S. Appl. No. 12/154,517, filed May 22, 2008.

* cited by examiner

FIG. 7D

## NEAR FIELD TRANSDUCER HAVING MAIN BODY AND WINGS EXTENDING THEREFROM AND ONLY ELECTRICALLY COUPLED THEREBY

FIELD OF THE INVENTION

The present invention relates to data storage systems, and more particularly, this invention relates to write heads with near field transducers for thermally assisted recording.

BACKGROUND OF THE INVENTION

The heart of a computer is a magnetic disk drive which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating, unless there is a load/unload ramp so contact with the disk does not occur; but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface and writes data within this heated region. The data state becomes "fixed" upon cooling the media to ambient temperatures. This technique is broadly referred to as "thermally assisted (magnetic) recording", TAR or TAMR. It can be applied to both longitudinal or perpendicular recording systems, although the highest density state of the art storage systems are more likely to be perpendicular recording systems. Heating of the media surface has been accomplished by a number of techniques such as focused laser beams or near field optical sources.

U.S. Pat. No. 6,999,384 to Stancil et al., which is herein incorporated by reference, discloses near field heating of a magnetic medium.

What is needed is a way to further improve TAR systems.

SUMMARY OF THE INVENTION

According to one embodiment, an apparatus includes a near field transducer comprising a conductive metal film having a main body, a ridge extending from the main body, and wings extending from the main body in a same direction as the ridge, wherein the wings are only electrically coupled by the main body.

In another embodiment, an apparatus includes a near field transducer comprising a conductive metal film having a main body, a ridge extending from the main body, and wings extending from the main body in a same direction as the ridge. Also the apparatus includes a layer of magnetic material positioned beyond the wings relative to the main body, wherein a length of the layer of magnetic material adjacent the near field transducer is at least about coextensive with a length of the main body in a same direction.

In another embodiment, an apparatus includes a near field transducer comprising a conductive metal film having a main body, a ridge extending from the main body, and wings extending from the main body in a same direction as the ridge, wherein a distance between one of the wings and the ridge is about the same as a length of the main body between an edge from which the ridge extends and an opposite edge.

Any of these embodiments may be implemented in a magnetic data storage system (e.g., tape drive, disk drive, etc.), which may include a magnetic head, a drive mechanism for passing a magnetic medium (e.g., magnetic tape, hard disk, etc.) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, an apparatus comprises a near field transducer comprising a conductive metal film having a main body, a ridge extending from the main body, and wings extending from the main body in a same direction as the ridge, wherein the wings are only electrically coupled by the main body. As an option, the apparatus may further comprise an optical waveguide for illumination of the near field transducer.

In another general embodiment, an apparatus comprises a near field transducer comprising a conductive metal film having a main body, a ridge extending from the main body, and wings extending from the main body in a same direction as the ridge; and a layer of magnetic material positioned beyond the wings relative to the main body, wherein a length of the layer of magnetic material adjacent the near field transducer is at least about coextensive with a length of the main body in a same direction. As an option, the apparatus may further comprise an optical waveguide for illumination of the near field transducer.

In yet another general embodiment, an apparatus comprises a near field transducer comprising a conductive metal film having a main body, a ridge extending from the main body, and wings extending from the main body in a same direction as the ridge, wherein a distance between one of the wings and the ridge is about the same as a length of the main body between an edge from which the ridge extends and an opposite edge. As an option, the apparatus may further comprise an optical waveguide for illumination of the near field transducer.

Figure 1:
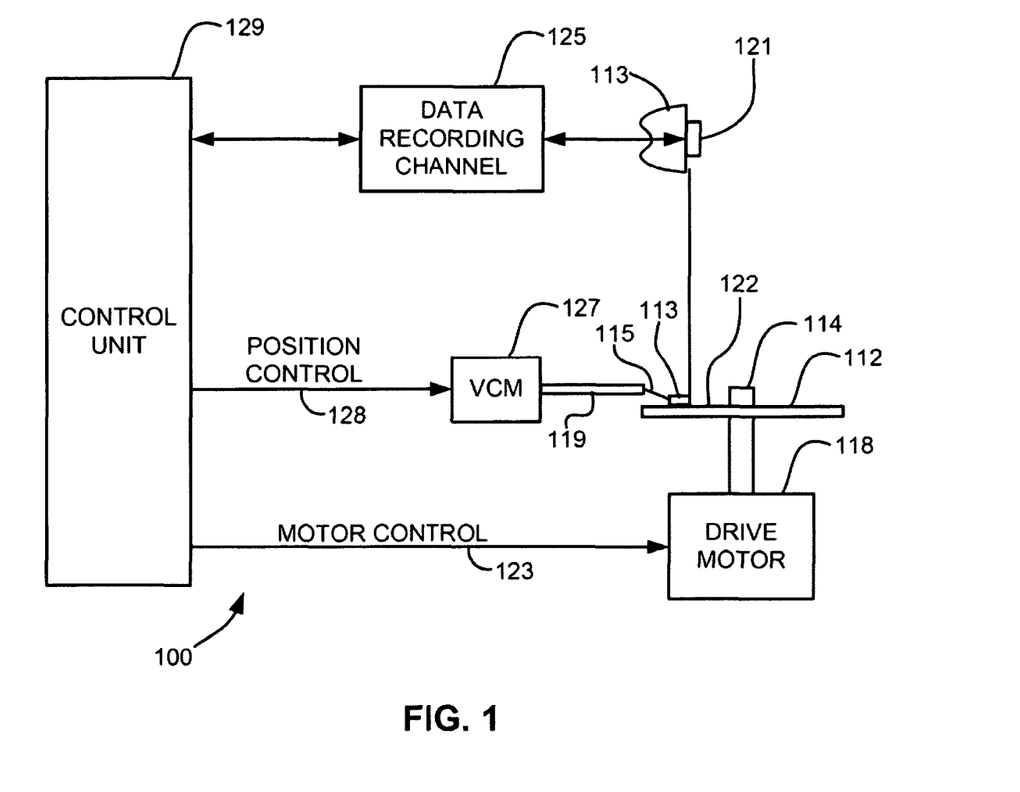
FIG. 1 is a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 comprises logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figures 2A, 2C:
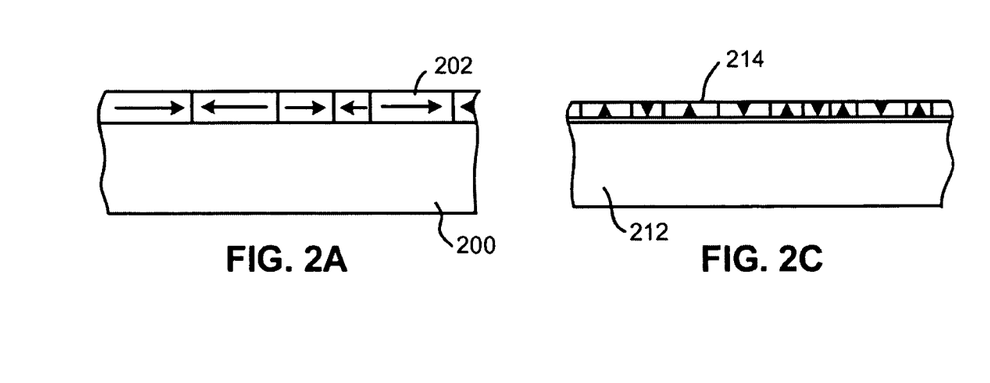
FIG. 2A is a schematic representation in section of a recording medium utilizing a longitudinal recording format.
FIG. 2C is a magnetic recording medium utilizing a perpendicular recording format.

FIG. 2A illustrates, schematically, a conventional recording medium such as used with magnetic disc recording systems, such as that shown in FIG. 1. This medium is utilized for recording magnetic domains in or parallel to the plane of the medium itself. The recording medium, a recording disc in this instance, comprises basically a supporting substrate 200 of a suitable non-magnetic material such as glass, with an overlying coating 202 of a suitable and conventional magnetic layer.

Figure 2B:
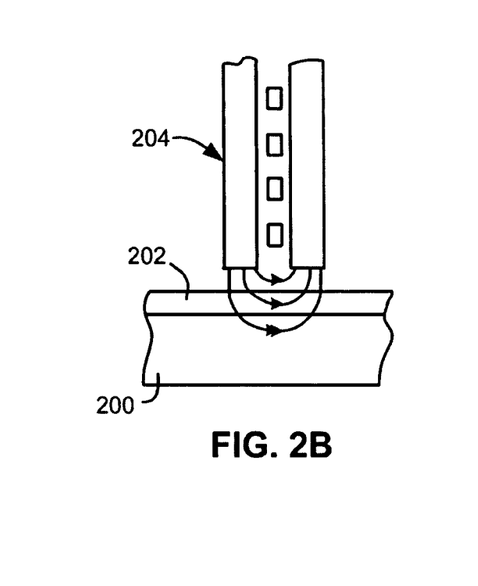
FIG. 2B is a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

FIG. 2C illustrates, schematically, the orientation of magnetic domains substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
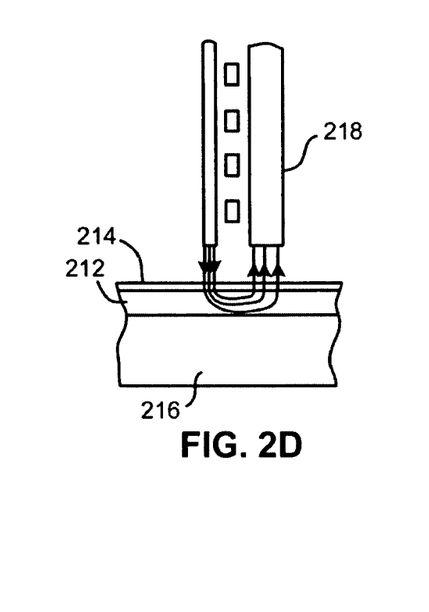
FIG. 2D is a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic domains having their axes of magnetization substantially perpendicular to the surface of the medium. The flux is channeled by the soft underlying coating 212 back to the return layer (P1) of the head 218.

Figure 2E:
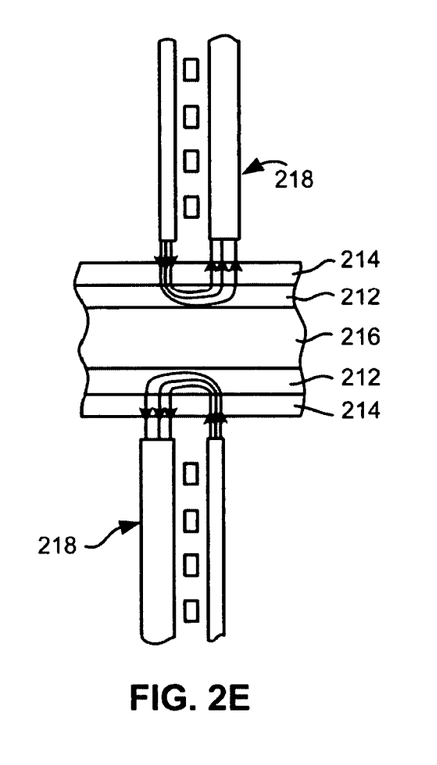
FIG. 2E is a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
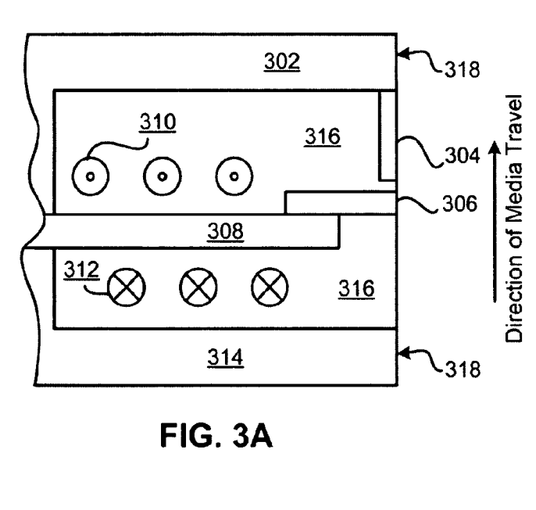
FIG. 3A is a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
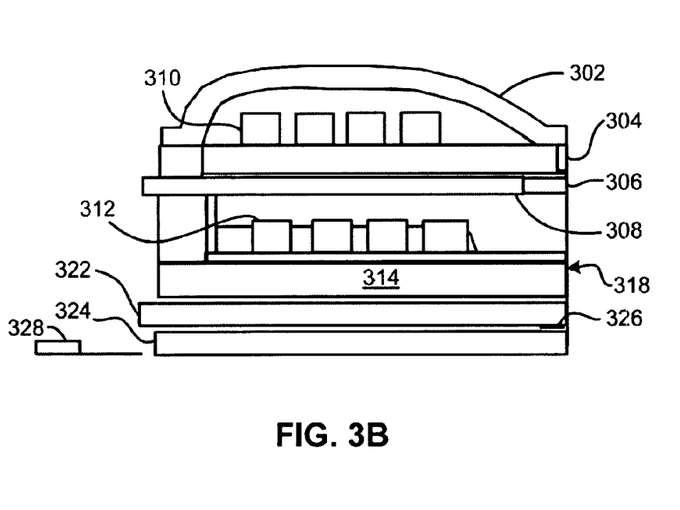
FIG. 3B is a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
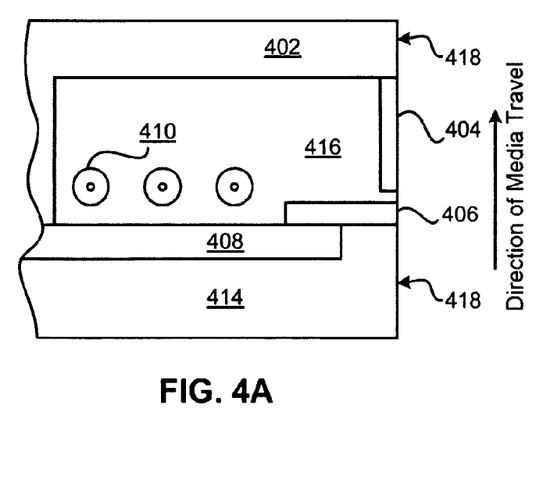
FIG. 4A is a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
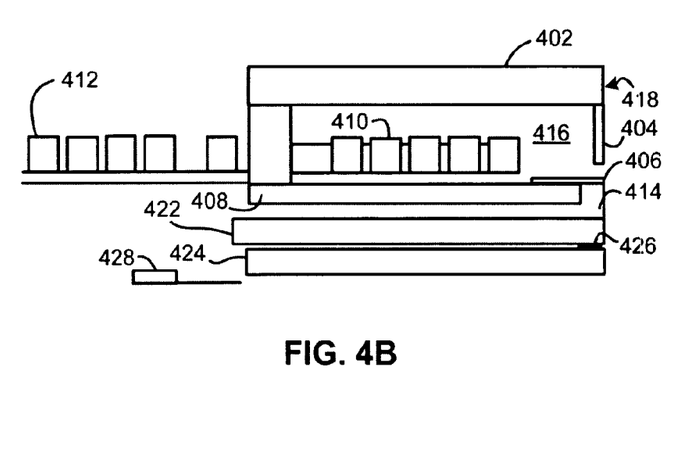
FIG. 4B is a cross-sectional view of one particular embodiment of a piggyback magnetic head with looped coils.

FIG. 4B illustrates another type of piggyback magnetic head having similar features to the head of FIG. 4A including looped coils 410, which loops around to form looped coils 412. Also, sensor shields 422, 424 are shown. The sensor 426 is typically positioned between the sensor shields 422, 424.

In FIGS. 3B and 4B, an optional heater 328, 428, respectively, is shown near the non-ABS side of the magnetic head. A heater 328, 428 may also be included in the magnetic heads shown in FIGS. 3A and 4A. The position of this heater may vary based on design parameters such as where the protrusion is desired, coefficients of thermal expansion of the surrounding layers, etc.

Thermally assisted recording (TAR) is a method of recording information onto a magnetic recording medium, such as a disk, tape, etc. The general motivation for this invention relates to the design of a recessed dielectric waveguide and integration with a near-field optical transducer for TAR. The waveguide core may be optimally recessed by a distance from the transducer and this space may be filled with low index dielectric material leading to significant enhancement of the optical efficiency. In one preferred embodiment, the low index dielectric material in the recessed space may be deposited after fabrication of the near-field transducer using an anisotropic deposition followed by deposition of the high index core material.

According to some embodiments, for TAR to be realized, it may be beneficial to confine heat to a single data track (an exemplary data track may be approximately 40 nm wide or smaller) with high efficiency. Candidate near-field optical sources typically use a low-loss metal (Au, Ag, Al, Cu, etc.) shaped in such a way as to concentrate surface charge motion at a tip apex located at the slider ABS when light is incident. Oscillating tip charge may create an intense near-field pattern, heating the disk. Sometimes, the metal structure can create resonant charge motion (surface plasmons) to further increase intensity and disk heating. For example, when polarized light is aligned with the corner of a triangular-shaped gold plate, an intense near field pattern may be created at that corner. Resonant charge motion may occur by adjusting the triangle size to match a surface plasmon frequency to the incident light frequency. Another near-field transducer is the ridge slot waveguide from microwave circuits applied to optical frequencies (also known as the C aperture). This shape may be characterized by five parameters including the metal thickness. Light polarization may be aligned with the ridge and incident light may concentrate surface charge at the tip of the ridge.

Previously, a ridge waveguide in silver has been optimized at a wavelength of 516 nm and a metal-to-metal fly-height of 8 nm. Also, far field measurements obtained for various C aperture sizes indicate a spectral shift while narrow resonant behavior has been observed when a pattern of ridges is used to excite surface plasmons around a long slot and enhance far field transmission. The majority of embodiments described herein relate to using a ridge waveguide of some kind to enhance the writing capabilities in TAR.

U.S. Pat. No. 6,999,384 to Stancil et al., incorporated by reference above, describes the phenomenon of near field heating of a magnetic medium in more detail.

Figure 5A:
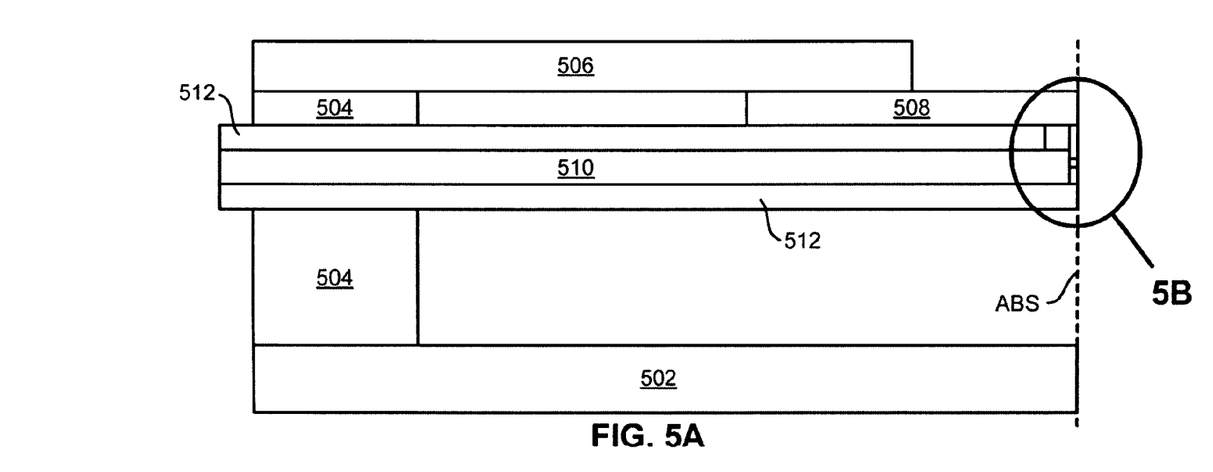
FIG. 5A is a partial cross section view of a thin film perpendicular write head design according to one embodiment.

Now referring to FIG. 5A, a partial cross section view 500 of a thin film perpendicular write head design incorporating an integrated antenna near field optical source is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

With continued reference to FIG. 5A, the write head comprises lower return pole layer 502, back-gap layer(s) 504, upper return pole layer 506, and upper pole tip layer 508. Lower return pole layer 502 may also have a lower pole tip (not shown) at the ABS. Layer 510 is an optical waveguide core, surrounded by cladding layers 512 according to some embodiments. Layers 510 and 512 extend through at least a portion of back-gap layer(s) 504. The components inside of Circle 5B are shown in an expanded view in FIG. 5B. Coil layers (not shown) and various insulating and spacer layers (not shown) might reside in the cavity bounded by the ABS, back-gap(s) 504, lower return pole 502, and upper bounding layers 506, 508, and 512 as would be recognized by those of skill in the art. Layers 502, 504, 506, and 508 may be comprised of a suitable magnetic alloy or material, as would be known by one of reasonable skill in the relevant art. Exemplary materials include Co, Ni, and/or Fe and compounds thereof. Layer 510 may be comprised of a suitable light transmitting material, as would be known by one of reasonable skill in the relevant art. Exemplary materials preferably include $Ta_2O_5$, and/or $TiO_2$. As shown, the core layer 510 has approximately uniform cross section along its length. As well known in the art, the optical waveguide 510 can have a number of other possible designs including a planar solid immersion mirror or planar solid immersion lens which have a non-uniform core cross section along the waveguide's length.

Figure 5B:
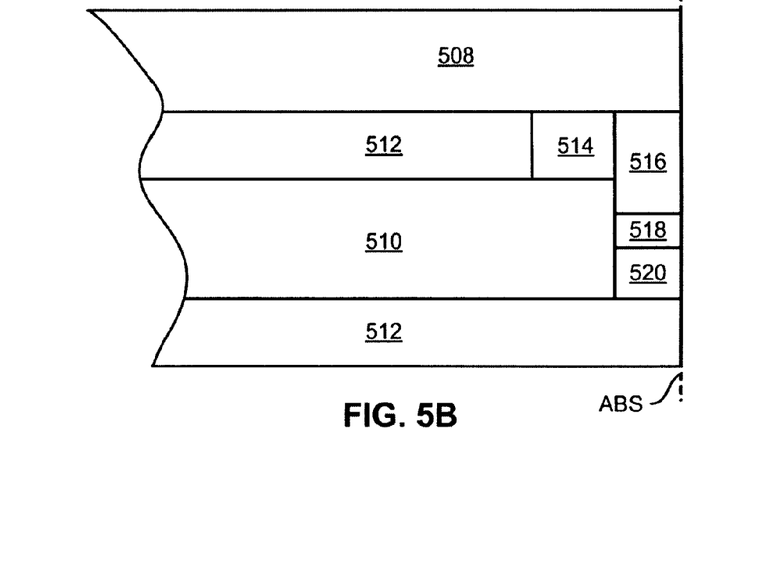
FIG. 5B is a partial cross section expanded view of detail 5B in FIG. 5A, in accordance with one embodiment.

FIG. 5B is a partial cross section expanded view of detail 5B in FIG. 5A, in accordance with one embodiment. Pole lip 516 is magnetically coupled to upper pole tip layer 508, and to optional magnetic step layer 514. Dielectric 518, antenna 520, and pole lip 516 comprise the near field optical source (or near field transducer), which is supplied optical energy via optional optical waveguide core 510. Pole lip 516 and optional magnetic step layer 514 may be comprised of a suitable magnetic alloy, such as Co, Fe, Ni, and/or compounds thereof. Antenna 520 may be comprised of Cu, Au, Ag, and/or alloys thereof, etc.

With continued reference to FIG. 5B, cladding layer 512 thickness may be nominally about 200 nm, but may be thicker or thinner depending on the dimensions of other layers in the structure. Optional magnetic step layer 514 may have a nominal thickness (the dimension between layers 508 and 510) of about 150 nm, and a nominal depth (as measured from layer 516 to layer 512) of about 180 nm. Pole lip 516 may have a nominal depth (as measured from the ABS) approximately equal to that of layer 520, with the value being determined by the performance and properties of the near field optical source (see examples below). The thickness of the pole lip 516 can vary from about 150 nm (with the optional magnetic step layer 514) to about 1 micron, preferably between about 250 nm and about 350 nm. The thickness of optical waveguide core layer 510 may be nominally between about 200 nm and about 400 nm.

Figure 6A:
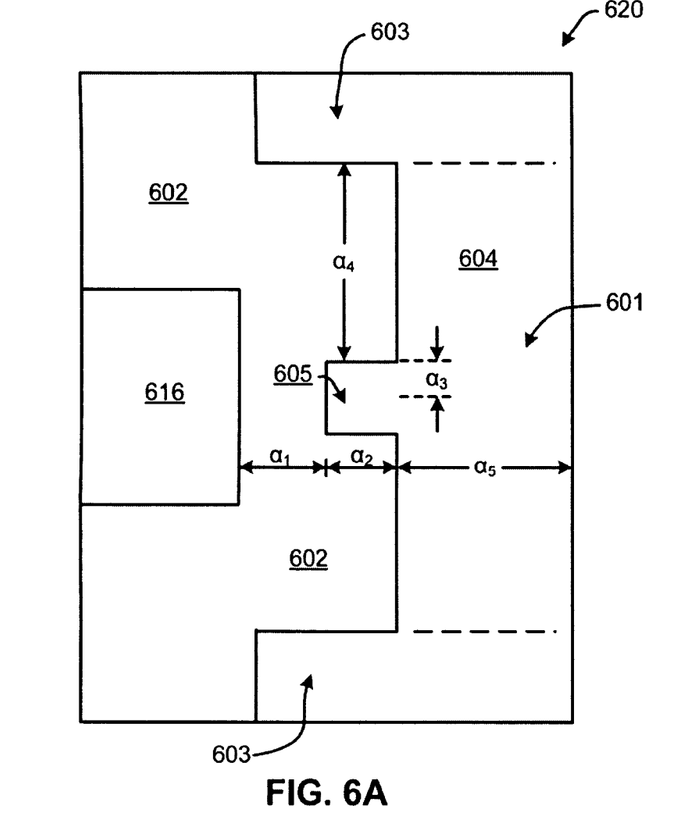
FIG. 6A is a top view of a near field transducer according to one embodiment.

Now referring to FIG. 6A, a top view of a near field transducer 620 is shown according to one embodiment. Of course, this embodiment may be used in conjunction with any structures and systems described in any of the other figures, such as FIGS. 1-5B.

Figure 6B:
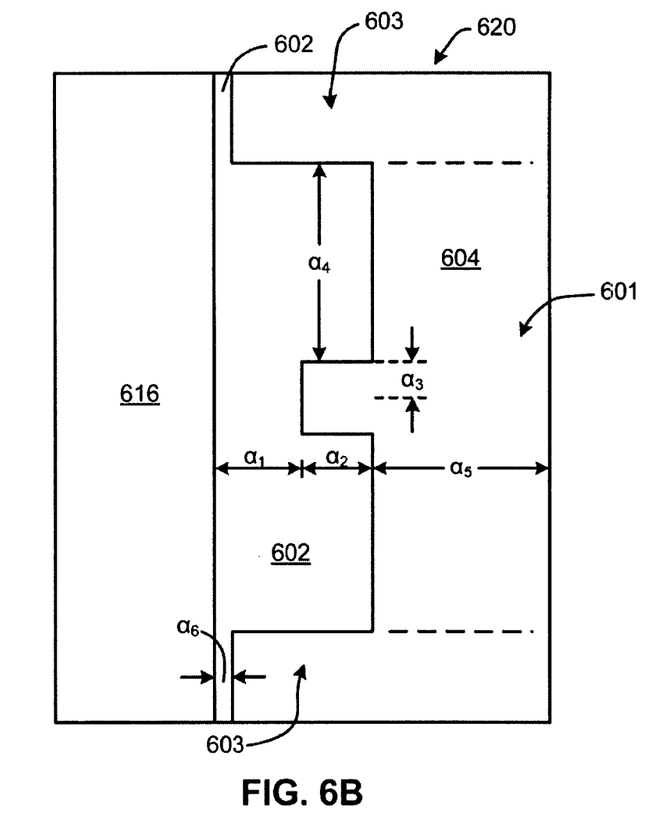
FIG. 6B is a top view of a near field transducer according to another embodiment.
Figure 6C:
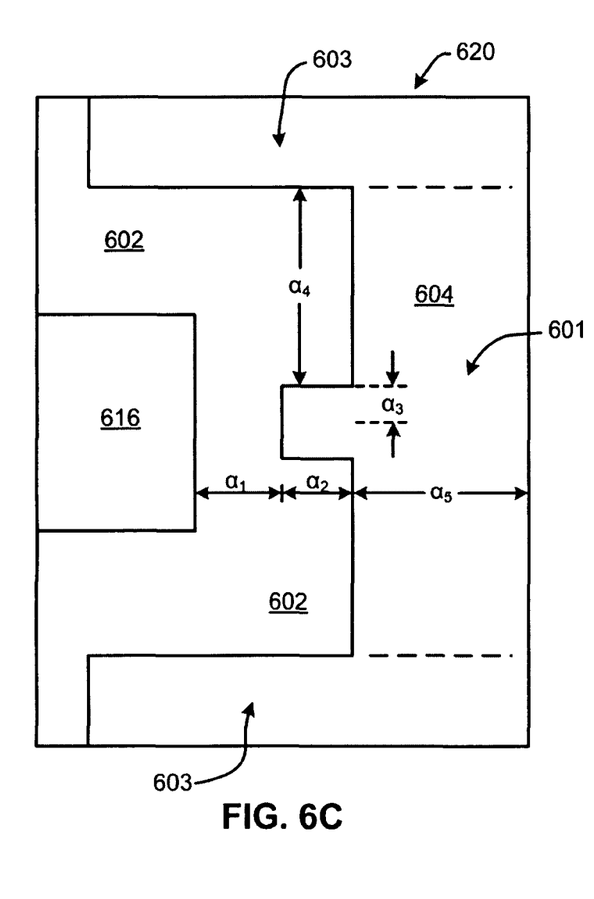
FIG. 6C is a top view of a near field transducer according to another embodiment.
Figure 6D:
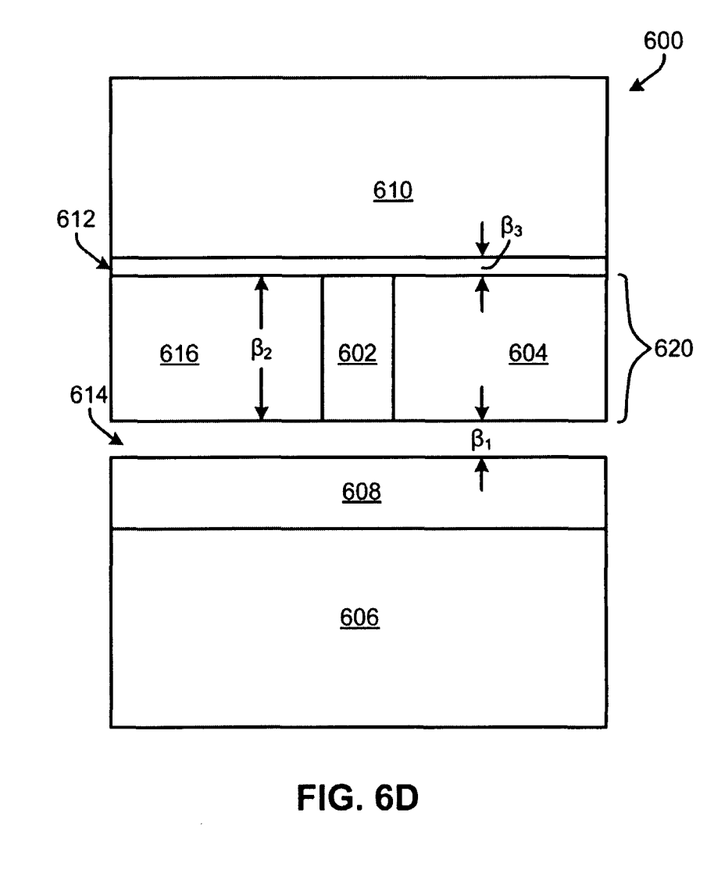
FIG. 6D is a side view of a structure including a near field transducer according to one embodiment.

As shown in FIG. 6A, a near field transducer 620 may include a dielectric layer 602, and may be included in a structure (600, FIG. 6D). The dielectric layer 602 may be surrounded by a conductive metal film 604 on one, two, three, or four sides, and both of these components together may comprise the near field transducer 620. The near field transducer may be described as a plasmonic device with a field enhancing ridge and may comprise a conductive metal film 604 having a main body 601 and a ridge 605 extending from the main body 601, and wings 603 extending from the main body 601 in a same direction as the ridge 605. The wing sections 603 are indicated by the dashed lines separating the upper and lower portions of the near field transducer 620 from the main body section 601. Because the conductive metal film 604 may have the shape of the letter "E," it can be called the E-antenna.

In some embodiments, the wings 603 may only be electrically coupled by the main body 601, e.g., the main body 601 and wings 603 may be comprised of different layers, materials, etc. In some further embodiments, as shown in FIG. 6A, no electrical conductor may be positioned between the wings, i.e., the layer of magnetic material 616 is not positioned between the wings 603.

Note that the conductive metal film 604 may be formed of various layers, and is not necessarily a unitarily-formed film. In some embodiments, the conductive metal film 604 may be generally non-triangular in shape. Further, a layer of magnetic material 616 may extend at least a portion of a distance between the wings 603, or may not extend between the wings 603 at all, as shown in FIG. 6A.

In some embodiments, the layer of magnetic material 616 may be positioned between the wings 603, and may further be electrically isolated from the wings 603, i.e., by an insulating layer 602. Note that insulating layer 602 may be composed of more than one dielectric layer and that each of these dielectric layers may be formed of different materials and at different times.

The dielectric layer 602 may isolate the ridge 605 on three sides, and may be comprised of $SiO_2$, $Al_2O_3$, or any other suitable material as would be known to one of reasonable skill in the relevant art. The conductive metal film 604 may be comprised of Au, Cu, Ag, and/or compounds thereof, etc., or any other suitable material as would be known to one of reasonable skill in the relevant art.

In some preferred embodiments, the near field transducer 620 and/or a system comprising the near field transducer 620 may be used with an optical waveguide for illumination of the near field transducer 620, as shown in FIG. 6D.

The values of the several dimensions indicated in FIG. 6A may be adjusted according to specific needs of the application, and the following dimensions are for example only, and in no way limit the scope of the invention. Each dimension may be larger or smaller depending on the dimensions of other layers in the structure 600. In some embodiments, the length of $\alpha_1$ may be about equal to the length of $\alpha_2$. Also, in some embodiments, the length of $\alpha_1$ and/or $\alpha_2$ may be preferably between about 10 nm and about 50 nm, for example about 30 nm.

In some approaches, a distance $\alpha_4$ between one of the wings 603 and the ridge 605 may be about the same as a length $\alpha_5$ of the main body 601 between an edge from which the ridge 605 extends and an opposite edge. In further approaches, the distance $\alpha_4$ may preferably be between about 100 nm and about 150 nm, for example about 130 nm.

In some embodiments, the near field transducer 620 and/or a system comprising the near field transducer 620 may further comprise a dielectric layer positioned between the wings 603. The dielectric layer may be the dielectric layer 602 as shown in FIG. 6A, or may be any other layer or shape as would be known by one of ordinary skill in the relevant art.

In additional embodiments, as shown in FIG. 6A, the near field transducer 620 and/or a system comprising the near field transducer 620 may further comprise a layer of magnetic material 616 positioned beyond the wings 603 relative to the body 601, wherein a length of the layer of magnetic material 616 adjacent the near field transducer 620 is at least about coextensive with a length of the main body 601 in a same direction, e.g., in a direction perpendicular to a direction of extension of the ridge 605.

Figure 7A:
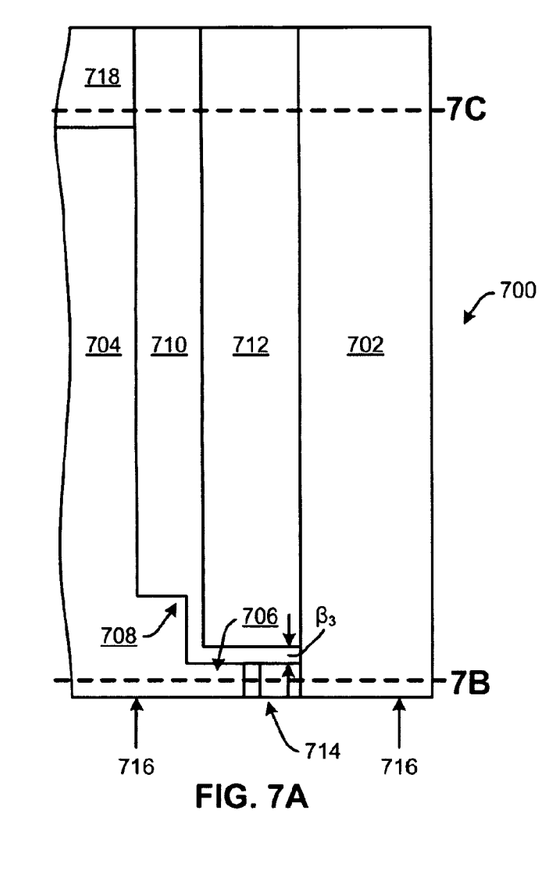
FIG. 7A is a side view of a structure including a near field transducer according to one embodiment.

In some preferred embodiments, the layer of magnetic material 616 may be comprised of a portion of a main pole, for example main pole 704 as shown in FIG. 7A.

FIG. 6B shows a near field transducer and associated structures according to another embodiment. The near field transducer 620 and/or a system comprising the near field transducer 620 may further comprise a layer of magnetic material 616 positioned beyond the wings 603, relative to the body 601, wherein a length of the layer of magnetic material 616 adjacent the near field transducer 620 is at least about coextensive with a length of the main body 601 in a same direction, e.g., in a direction perpendicular to a direction of extension of the ridge 605. In some further embodiments, the layer of magnetic material 616 may be electrically isolated from the wings 603, possibly by a portion of insulating layer 602. In this embodiment, the distance $\alpha_6$ may preferably have a thickness of between 0 nm and about 80 nm, for example about 8 nm. In further embodiments, at least one dielectric layer may be positioned between the layer of magnetic material 616 and the wings 603.

FIG. 6C shows a near field transducer and associated structures according to another embodiment. The near field transducer 620 and/or a system comprising the near field transducer 620 may further comprise a layer of magnetic material 616 positioned between the wings 603, and the layer of magnetic material 616 may be electrically isolated from the wings 603, possibly by an insulating layer 602. In further embodiments, at least one dielectric layer may be positioned between the layer of magnetic material 616 and the wings 603.

FIG. 6D is a side view of a structure 600 including a near field transducer 620 according to one embodiment. The structure 600 may comprise a near field transducer 620, which includes an E-antenna 604. The height $\beta_2$ of the near field transducer 620 may be between about 30 nm and about 300 nm, and may be set according to a relationship with the wavelength of a light. Above the near field transducer 620, a core layer 610 may be formed of $TiO_2$, $Ta_2O_5$, etc., or any other suitable material as would be known to one of reasonable skill in the relevant art. The core layer 610 may be insulated from the near field transducer 620 by a thin layer of material forming a recess 612, comprised of a low index material like $Al_2O_3$, $SiO_2$, etc. In some embodiments, the recess 612 and the dielectric layer 602 may be comprised of the same material. In general, a low index material can be any material having an index below about 1.75.

In some embodiments, the near field transducer 620 may be separated from the optical waveguide, which may include the core layer 610 and surrounding cladding layers, by a recess 612 having a thickness $\beta_3$ of greater than about 0 nm and less than or equal to about 100 nm. In other approaches, the optical waveguide may be spaced from the near field transducer 620 by between about 100 nm and about 10 nm, by between about 80 nm and about 10 nm, by between about 60 nm and about 10 nm, by between about 100 nm and about 20 nm, by between about 100 nm and about 40 nm, etc.

With continued reference to FIG. 6D, an air gap 614 may be formed below the near field transducer 620, with a thickness $\beta_1$ of between about 1 nm and about 50 nm, which may act as a gap between the head and a disk surface, including a recording layer 608. Below the air gap 614, a recording layer 608 may be formed of any suitable material as would be known to one of reasonable skill in the relevant art, such as CoPt or FePt. Below the recording layer 608, a heatsink 606 may be formed, as would be known to one of reasonable skill in the relevant art.

In some embodiments, a light guiding core layer of the optical waveguide may be spaced from the near field transducer 620 by less than about 100 nm and greater than 0 nm.

Other layers and combinations of layers may be used in the structure 600 as would be used by one of ordinary skill in the relevant art, including insulating layers, adhesive layers, etc. In addition, any of the layers described in relation to structure 600 may be comprised of multiple layers, which may or may not be of the same material.

Now referring to FIG. 7A, a cross section taken from the middle of another structure 700 is shown according to one embodiment. The structure 700 may be a magnetic head with near field transducer 714, possibly including an E-antenna 602, comprising a conductive metal film (604, FIG. 7B), and an integrated waveguide, possibly for illumination of the near field transducer 714, with a light guiding core layer 712 of the optical waveguide being spaced from the near field transducer 714 by a distance $\beta_3$. Of course, this embodiment may be used in conjunction with any structures and systems described in FIGS. 1-6B. The structure may include a main pole 704 which may be comprised of any material as would be known to one of reasonable skill in the relevant art, such as NiFe, CoFe, CoNiFe, etc. The main pole 704 may have a step 708 formed near the lower portion of the main pole 704. In addition, the main pole 704 may have a lip 706 formed near the ABS 716.

In some embodiments, the distance $\beta_3$ may be less than about 100 nm and greater than about 10 nm. In other approaches, the optical waveguide may be spaced from the near field transducer 714 by between about 80 nm and about 10 nm, by between about 60 nm and about 10 nm, by between about 100 nm and about 20 nm, by between about 100 nm and about 40 nm, etc.

Next to the main pole 704, a lower cladding layer 710 may be formed which may isolate the main pole 704 from light propagating in core layer 712. The lower cladding layer 710 may be formed of any low index, isolating material as would be known to one of ordinary skill in the relevant art, such as $Al_2O_3$, $SiO_2$, etc. The gap between metal film (604, FIG. 7B)

and magnetic lip 706 may be filled with any optically transparent material such as $SiO_2$, $Al_2O_3$, etc., as is well known to those skilled in the art.

In addition, the isolating layer may form a thin layer between the near field transducer 714 and the core layer 712 of the optical waveguide, forming a recess between the near field transducer 714 and the core layer 712. This separation of the near field transducer 714 from the core layer 712 causes the optical efficiency of the structure 700 to significantly improve.

In some embodiments, an insulating layer 602 may electrically isolate the main pole 704 from the E-antenna 604. The insulating layer 618 may be comprised of any material as would be known to one of ordinary skill in the relevant art, such as $SiO_2$, $Al_2O_3$, etc.

The core layer 712 is generally used to deliver light energy to a disk surface, thereby inducing isolated heating of the disk surface. The core layer 712 may be comprised of any high index material, such as $TiO_2$, $Ta_2O_5$, etc., or any other material as would be known by one of ordinary skill in the relevant art. On top of core layer 712, a top cladding layer 702 may be formed, from any material as would be known to one of ordinary skill in the relevant art, such as $Al_2O_3$, $SiO_2$, etc. In addition, a cladding layer 718 may be formed above the main pole 704. The lower cladding layer 710 may also form a recess between the optical waveguide and the near field transducer 714, according to some embodiments.

Figure 7B:
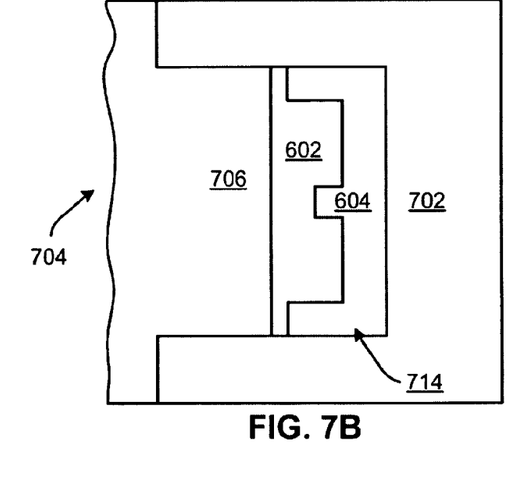
FIG. 7B is a top view of a lower portion of a structure taken from Line 7B in FIG. 7A according to one embodiment.

FIG. 7B shows an ABS view taken from Line 7B in FIG. 7A of the structure 700 according to one embodiment. As shown, the main pole 704 may form a magnetic lip 706 that extends toward the near field transducer 714. The main pole 704 may also comprise the layer of magnetic material as previously described herein. The dielectric layer 602 may be surrounded on three sides by a conductive metal film 604, such as Au, Ag, Cu, etc. The notch in the dielectric layer 602 may also be filled with the conductive metal film 604. The three sides of the metal film 604 which is not in contact with the dielectric 602 may be adjacent to the cladding layer 702.

In some preferred embodiments, an insulating layer 602 may electrically isolate the E-antenna 604 from the main pole 704. In addition, a portion of the insulating layer 602 between the main pole 704 and the E-antenna 604 may preferably have a thickness of between 0 nm and about 80 nm, for example about 8 nm.

Typically, a near field transducer optical source consists of a rectangular shaped dielectric layer placed in an electrically conductive metal film. In some embodiments, the near field transducer may include an E-antenna. Light of the appropriate frequency is directed onto the antenna and the surrounding dielectric films.

In the present embodiment, light is directed to the near field transducer 714 which comprises the dielectric layer 602 and surrounding metal film 604, via optional optical waveguide core layer 712. Extending into the center portion of the dielectric layer 602 is an electrically conductive ridge, generally an extension of the surrounding metal film 604. Incident radiation, polarized in the direction parallel to the ridge produces a near-field light source which appears close to or at the end of the ridge, in the gap between the end of the ridge and the opposing boundary of the dielectric layer 602. In the present embodiment, magnetic lip 706 is located at this opposing boundary, placing the near field light source in close proximity to the magnetic lip 706.

Modeling studies performed in the development of the present embodiment have uncovered the unexpected development that a magnetic lip 706 of approximately the same height as antenna material 604, can be in close proximity to the antenna with minimal impact on the optical efficiency, provided that the magnetic lip 706 borders dielectric layer 602, and is located across from the end of the ridge. This locates the effective pole tip of the write head at very close proximity to the thermal region generated by a near field light source, which is located between the end of the ridge and the edge of magnetic lip 706.

Figure 7C:
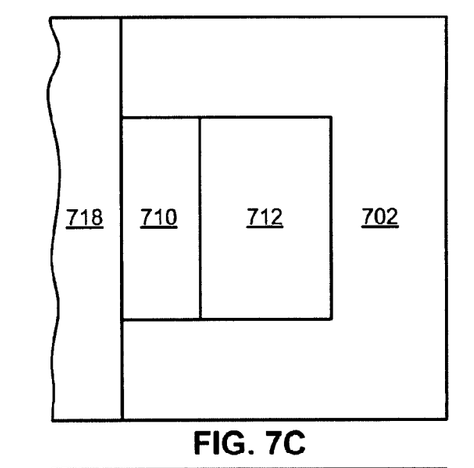
FIG. 7C is a top view of an upper portion of a structure taken from Line 7C in FIG. 7A according to one embodiment.

FIG. 7C shows a cross section view taken from Line 7C in FIG. 7A of the structure 700 according to one embodiment. As shown at this position away from the ABS 716, the structure 700 may be generally referred to as an optical waveguide. A cladding layer 702 may surround three sides of a structure formed of the isolating layer 710 and the core layer 712, while another cladding layer 718 may be formed on the remaining side. The core layer 712 may have a rectangular cross section, or any other cross sectional profile as selected by one of ordinary skill in the relevant art, such as square, triangular, circular, etc. Other waveguide structures may also be used, such as solid immersion mirrors, solid immersion lenses, etc.

In each of FIGS. 7A-7C, the left most portion of the figure may extend further and may form more shapes and may include additional layers. Also, other layers and combinations of layers may be used in the structure 700 as would be used by one of ordinary skill in the relevant art, including insulating layers, adhesive layers, etc. In addition, any of the layers described in relation to structure 700 may be comprised of multiple layers, which may or may not be of the same material.

Figure 7D:
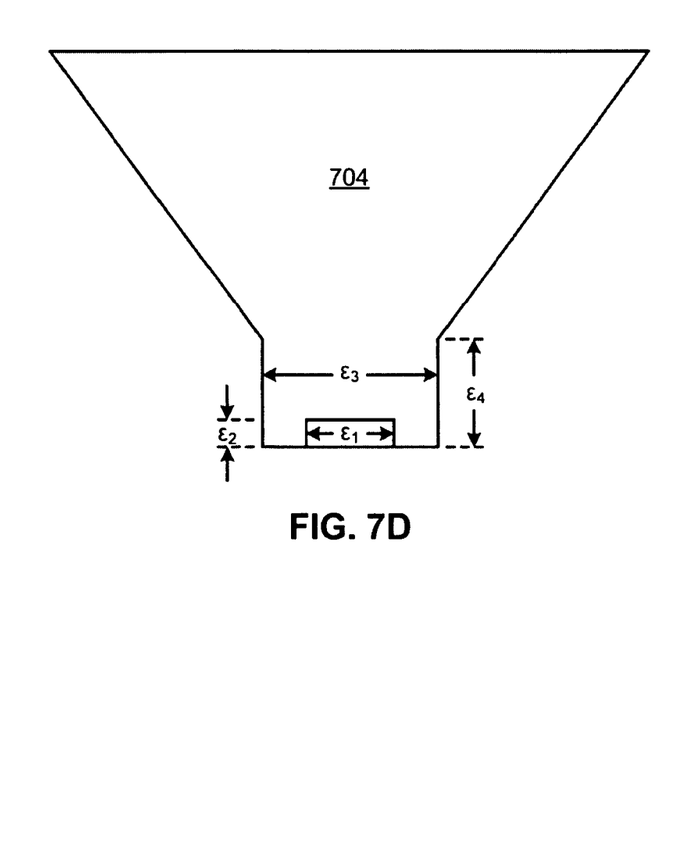
FIG. 7D is a trailing view of a main pole according to one embodiment.

Now referring to FIG. 7D, a trailing view is shown of the main pole 704 according to one embodiment. As shown, the main pole 704 may taper outwardly from a lower portion. The height dimension $\in_4$ indicates the height of the step (708, FIG. 7A), which may be between about 100 and about 1000 nm, preferably about 500 nm. The height dimension $\in_2$ indicates the height of the pole lip (706, FIG. 7A), which may be between about 20 nm and about 200 nm, preferably about 90 nm. In addition, the width dimension $\in_3$ indicates the width of the step (708, FIG. 7A), which may be between about 200 nm and about 2000 nm, preferably about 1000 nm. The width dimension $\in_1$ indicates the width of the pole lip (706, FIG. 7A), which may be between about 100 nm and about 1000 nm, preferably about 600 nm.

Figure 7E:
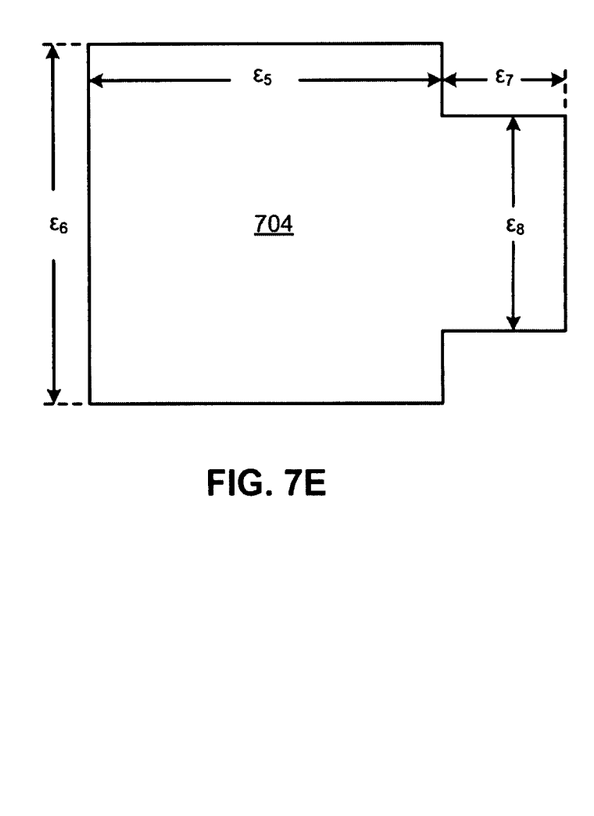
FIG. 7E is a top view of a main pole according to one embodiment.

Now referring to FIG. 7E, a partial ABS view of the main pole 704 is shown according to one embodiment. As can be seen, the main pole 704 may have a narrower portion and a thicker portion. According to some embodiments, the dimensions, $\in_5$ and $\in_6$ may be about equal. In addition, the dimensions $\in_5$ and $\in_6$ may be between about 200 and 2000 nm, preferably about 1000 nm. The dimension $\in_7$ may be between about 70 nm and about 700 nm, preferably about 350 nm. The dimension $\in_8$ may be between about 100 nm and about 1000 nm, preferably about 600 nm.

In some embodiments, at least a portion of the near field transducer 714 may include magnetic material, such as Fe, Ni, Co, and/or compounds thereof, etc.

Each of the dimensions described in regard to FIGS. 7D and 7E may be more or less, depending on the particular sizes and shapes of components in the head and system.

Although many of the embodiments discussed above have included an optical waveguide, the invention is not so limited. Other uses of the invention, in various embodiments, include near-field scanning optical microscopy (NSOM), lithography, phase-change recording, etc.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
a near field transducer comprising a conductive metal film having a main body, a ridge extending from the main body, and wings extending from the main body in a same direction as the ridge, wherein the wings are only electrically coupled by the main body,
wherein the near field transducer is configured to heat a magnetic disk in a vicinity of the ridge upon exposure of the conductive metal film to light.

2. The apparatus as recited in claim 1, further comprising a dielectric layer positioned between portions of the wings extending from the main body.

3. The apparatus as recited in claim 1, wherein no electrical conductor is positioned between the wings extending from the main body.

4. The apparatus as recited in claim 1, further comprising a layer of magnetic material positioned between portions of the wings extending from the main body, the layer of magnetic material being electrically isolated from the wings.

5. The apparatus as recited in claim 4, further comprising at least one dielectric layer between the layer of magnetic material and the portions of the wings extending from the main body.

6. The apparatus as recited in claim 1, further comprising a layer of magnetic material positioned beyond the wings relative to the main body, wherein a length of the layer of magnetic material adjacent the near field transducer is at least about coextensive with a length of the main body in a same direction.

7. The apparatus as recited in claim 1, further comprising an optical waveguide for illumination of the near field transducer, wherein a light guiding core layer of the optical waveguide is spaced from the near field transducer by less than about 100 nanometers and greater than 0 nanometers.

8. The apparatus as recited in claim 1, wherein a distance between one of the wings and the ridge is about the same as a length of the main body between an edge from which the ridge extends and an opposite edge.

9. The apparatus as recited in claim 8, wherein the distance is between about 100 nanometers and about 150 nanometers.

10. An apparatus as recited in claim 1, further comprising:
a layer of magnetic material positioned beyond the wings relative to the main body, wherein a length of the layer of magnetic material adjacent the near field transducer is at least about coextensive with a length of the main body in a same direction.

11. The apparatus as recited in claim 10, wherein the wings are only electrically coupled by the main body.

12. The apparatus as recited in claim 10, wherein the layer of magnetic material is also positioned between the wings, the layer of magnetic material being electrically isolated from the wings.

13. The apparatus as recited in claim 10, further comprising at least one dielectric layer between the layer of magnetic material and the near field transducer.

14. The apparatus as recited in claim 10, further comprising an optical waveguide for illumination of the near field transducer, wherein a light guiding core layer of the optical waveguide is spaced from the near field transducer by less than about 100 nanometers and greater than 0 nanometers.

15. The apparatus as recited in claim 10, wherein a distance between one of the wings and the ridge is about the same as a length of the main body between an edge from which the ridge extends and an opposite edge.

16. An apparatus as recited in claim 1,
wherein a distance between one of the wings and the ridge is about the same as a length of the main body between an edge from which the ridge extends and an opposite edge.

17. The apparatus as recited in claim 16, wherein the wings are only electrically coupled by the main body.

18. The apparatus as recited in claim 16, further comprising a layer of magnetic material positioned between the wings, the layer of magnetic material being electrically isolated from the wings.

19. The apparatus as recited in claim 16, further comprising a layer of magnetic material positioned beyond the wings relative to the main body, wherein a length of the layer of magnetic material adjacent the near field transducer is at least about coextensive with a length of the main body in a same direction.

20. The apparatus as recited in claim 16, further comprising an optical waveguide for illumination of the near field transducer, wherein a light guiding core layer of the optical waveguide is spaced from the near field transducer by less than about 100 nanometers and greater than 0 nanometers.

21. A magnetic data storage system, comprising:
a magnetic head having a near field transducer as recited in claim 1;
a magnetic medium;
a drive mechanism for passing the magnetic medium over the magnetic head; and
a controller electrically coupled to the magnetic head for controlling operation of the magnetic head.

22. The apparatus as recited in claim 1, wherein the conductive metal film is nonmagnetic.

23. The apparatus as recited in claim 1, wherein the conductive metal film is constructed of a material selected from a group consisting of Au, Ag, Al, and Cu.

24. The apparatus as recited in claim 1, further comprising an optical waveguide for illumination of the conductive metal film, the conductive metal film being configured to create heat when illuminated.

* * * * *